United States Patent [19]
Burns

[11] Patent Number: 5,579,233
[45] Date of Patent: *Nov. 26, 1996

[54] METHOD OF ON-SITE REFUELING USING ELECTRONIC IDENTIFICATION TAGS, READING PROBE, AND A TRUCK ON-BOARD COMPUTER

[76] Inventor: Robert R. Burns, 4705 Wilford Way, Edina, Minn. 55435

[*] Notice: The term of this patent shall not extend beyond the expiration date of Pat. No. 5,420,797.

[21] Appl. No.: 370,097

[22] Filed: Jan. 9, 1995

[51] Int. Cl.⁶ .................................................. G06F 17/60
[52] U.S. Cl. ............................ 364/479.1; 221/23; 221/52
[58] Field of Search .................................. 364/478, 479, 364/425, 465, 510, 550; 340/825.35; 221/2, 5, 9; 222/14, 22, 23, 25–28, 52, 132

[56] References Cited

U.S. PATENT DOCUMENTS

| | | | |
|---|---|---|---|
| 4,490,798 | 12/1984 | Franks et al. | 364/478 |
| 4,658,371 | 4/1987 | Walsh et al. | 364/478 |
| 4,911,330 | 3/1990 | Viaanderen et al. | 222/132 |
| 5,113,351 | 5/1992 | Bostic | 364/479 |
| 5,270,943 | 12/1993 | Warn | 364/479 |
| 5,272,321 | 12/1993 | Otsuka et al. | 364/479 |
| 5,283,943 | 2/1994 | Aguayo et al. | 364/479 |
| 5,394,336 | 2/1995 | Warn et al. | 364/479 |
| 5,400,253 | 3/1995 | O'Connor | 364/479 |
| 5,420,797 | 3/1995 | Burns | 364/479 |

*Primary Examiner*—Roy N. Envall, Jr.
*Assistant Examiner*—Thomas E. Brown
*Attorney, Agent, or Firm*—Haugen and Nikolai, P.A.

[57] ABSTRACT

A method of on-site refueling, i.e., delivering petroleum and similar products from a tank truck into customer vehicles or other tanks at a customer's site, that ensures the accurate delivery of products in accordance with the instructions on a series of delivery lists. The method of delivery includes the use of a probe having digital memory and capable of comparing input signals from passive electronic tags with stored data and the use of a truck on-board computer able to read the truck's accumulating gallonage meters, and able to set relay contacts to directly control the refueling of vehicles identified as critical vehicles. Each use of the probe in reading a tag is recorded in the probe stored in its memory, and later downloaded into the on-board computer used to calculate the gallons and identify the product delivered into each customer tank. At the end of the day, the on-board computer is downloaded into an office computer to complete customer billing records, evaluate driver compliance with the delivery process, and post inventory, sales, and financial records.

18 Claims, 4 Drawing Sheets

CYBERMAC OIL COMPANY

DELIVERY LIST

RUN DATE: JUN 8, 1994 – 11:23 AM

LOAD NO    : 00079-0
SHIP DATE  : 06/09/94
SHIP TIME  : 0900
SHIP VIA   : OUR TRUCK

DRIVER   : AL BARKLEY
TRUCK    : 1  1992 FORD
TRAILER  : 1  GALVANEER 2500

CUST/SHIP-TO-NO: C
LOCATION: BULK PLANT

SHIP TO: DELIVERY STOPS LISTED BELOW

PRODUCTS TO LOAD

| | | TOTE | PKT5 | PKT4 | PKT3 | PKT2 | PKT1 | TOTAL |
|---|---|---|---|---|---|---|---|---|
| 122 | UNLEADED 87 OCT, 7.8% ETHANOL | | | 500 | 500 | 500 | 1,000 | 2,500 |
| 202 | DIESEL #2, DOES NOT CONTAIN | | 500 | | 500 | 500 | 1,000 | 2,000 |

LOAD SUMMARY

| | | TOTE | AVAILABLE | SCHEDULED | LOADED |
|---|---|---|---|---|---|
| 122 | UNLEADED 87 OCT, 7.8% ETHANOL | | 25 | 475 | 500 |
| 202 | DIESEL #2, DOES NOT CONTAIN | | 50 | 1,950 | 2,000 |

DELIVERY LIST

| | CUSTOMER NAME & ADDRESS | TANK & PRODUCT DESCRIPTION | SCHEDULE |
|---|---|---|---|
| 005 | INTRACITY BUS COMPANY<br>4466 NORTH 44TH AVENUE | 122  GASOLINE VEHICLES<br>     UNLEADED 87 OCT, 7.8% ETHANOL | 75 |
| 010 | | 202  DIESEL ON-ROAD VEHICLES<br>     DIESEL #2, DOES NOT CONTAIN | 1,200 |
| 015 | NORTH CENTRAL POWER<br>1234 METROPOLITAN HIGHWAY | 122  GASOLINE VEHICLE<br>     UNLEADED 87 OCT, 7.8% ETHANOL | 400 |
| 020 | | 202  DIESEL ON-ROAD VEHICLES<br>     DIESEL #2, DOES NOT CONTAIN | 750 |

FIG. 4

METHOD OF ON-SITE REFUELING USING ELECTRONIC IDENTIFICATION TAGS, READING PROBE, AND A TRUCK ON-BOARD COMPUTER

BACKGROUND OF THE INVENTION

I. Field of the Invention

This invention relates generally to a method of on-site refueling, i.e., delivering petroleum and similar products from a tank truck into customer vehicles or other tanks at a customer's site. More particularly, it relates to a method of ensuring the delivery of the proper petroleum or similar product, and the accurate recording of the delivery, from a plurality of petroleum and similar products carried on a tank truck, into customer vehicle fuel tanks (whether the vehicles are, for example, automobiles, trucks, or buses in a restricted company parking lot; or are construction machines and trucks at a construction site), and later verifying compliance with this method of delivery.

II. Discussion of the Related Art

The present invention is related to the Petroleum Delivery Method set out in Applicant's earlier-filed U.S. application Ser. No. 08/296,727, filed Aug. 26, 1994 (now U.S. Pat. No. 5,420,707). That earlier-filed Application discloses a method for assuring proper truck delivery of petroleum and similar products from a refinery or fuel bulk storage facility to a retailer's tanks, that utilizes a hand-held probe for interrogating machine-readable identifiers associated with the retailer's tanks and with the delivery truck's fuel delivery spigots. The present invention takes that method a step further and greatly simplifies the delivery of proper petroleum and similar products directly into a customer's fleet of vehicles located at that customer's site.

Currently, in the on-site delivery of petroleum and similar products, a delivery truck is used to transport various quantities and types of the products from a storage facility to customer sites, and then to deliver the products into customer vehicles or tanks at each site. The truck that is used is usually a 2,000- to 4,000-gallon truck, and is usually partitioned into several tank compartments for transporting various types of products. Each compartment of a typical delivery truck has an outlet valve, which controls the flow of the compartment's product to a pump, a meter, and a delivery hose, which may be shared with some or all of the other compartments by means of one or more manifolds. In many cases, the delivery truck will have more than one meter, each with an associated delivery hose, to thereby be able to meter more than one product, such as gasoline and diesel fuel, from the different compartments. Another reason to have more than one meter is to physically separate and bill differently for two different diesel fuels—one, tax-paid and undyed for use in vehicles licensed for on-road use; the other, tax-free and dyed for use in off-road vehicles, or construction equipment, or for use in heating.

In the past, a delivery truck driver delivering to a list of customer sites would be provided with Delivery Lists that identified the load number, the truck, the driver, the storage facility, the quantity and type of product to be loaded into each delivery truck compartment, the list of customer sites to which deliveries should be made, and a general description of the vehicles to be refueled. Markings on the vehicles, or the absence of markings, may indicate to the driver which vehicles to refuel, and which fuel to use if the driver's delivery truck contains more than one type of fuel. The Delivery Lists, a specimen of which is shown in FIG. 4, contain all of the information the driver needs to complete the deliveries to be made by the driver for the day.

When the driver arrives at each customer site, the driver manually records the beginning delivery truck meter reading, or meter readings if there is more than one meter on the truck. The driver then identifies one customer vehicle at a time, manually records its number or identity, and then refuels it depending on written instructions, vehicle markings, or the driver's personal judgment in regard to the choice of the proper fuel for each vehicle. At the completion of refueling each vehicle, the driver again must manually record a meter reading, the difference between it and the previous reading of that meter being the gallons delivered into the vehicle. Because the meter is located on the delivery truck, and considering that the delivery hose may be up to 150 feet long, this can be very wasteful of the driver's time. One solution is a radio-operated meter readout device carried by the driver, which saves walking time, but still requires manual recording by the driver and manual transcription by an office employee, both subject to error.

To efficiently produce an accurate list of vehicles refueled for substantiation of customer billing, there is a need to reduce the opportunity for errors in this process, and to eliminate all unnecessary labor. Even more important is the requirement to better control the refueling operation itself in regard to the delivery of the proper type of fuel into each vehicle, considering the vehicle's engine requirements, the tax laws, and environmental laws and regulations.

The most obvious vehicle engine requirement is that gasoline engines only be fueled with gasoline, and diesel engines with diesel fuel. If the driver refuels a gasoline-powered vehicle with diesel fuel, or vice versa, and the error goes undiscovered until the engine quits, the repair can be very costly. Even more serious is erroneously refueling emergency vehicles or small aircraft. In addition, some diesel vehicles in cold weather may require a blend of #1 and #2 diesel fuel to operate dependably, which is up to 10 percent more expensive than straight #2 fuel; yet, refueling all diesel vehicles with this blend may be unnecessarily costly, or may not be desired by some customers. Therefore, a method of dependably using the correct diesel fuel blend can be economically desirable to the refueler and to the refueler's customer.

The federal fuel excise tax laws introduce additional operating and financial considerations to the refueling process. (State tax laws will not be considered here because they differ from each other, and only add additional complexity.) Federal gasoline taxes are more complicated than federal diesel taxes, having four different per-gallon rates, currently $0.184, $0.1532, $0.1424, and $0.13, depending on the percentage of ethanol used, if any, in a blend with gasoline. These different rates can have an effect on the refueler's purchasing decisions, and must be properly shown on customer billings, but they are of minor importance in the refueling process itself, as long as the gasoline or blend provided in refueling meets the environmental regulations discussed below.

Federal gasoline taxes are owed by the refueler upon the refueler's accepting delivery from a refinery or terminal; there are no tax-free deliveries of gasoline to the refueler, even though some of the refueler's customers may not be subject to the tax. A tax-exempt customer may always claim a tax refund, but the refueler has the option to deliver the gasoline tax-free and to claim the refund itself as a service to two specific classes of customers: state and local government agencies, and nonprofit educational organizations.

Therefore, the most important tax considerations in refueling with gasoline products are that the refueler include the applicable taxes in the customer billing according to the law, and to the arrangement with that customer if the customer is tax-exempt; that the taxes be accurate in regard to the gasoline blend delivered (using the correct rate from among the four possible rates); and that the documentation of the vehicles refueled be sufficient to support the billings and tax refund claims.

Federal diesel taxes have only one rate, currently $0.244 per gallon, but are importantly different from gasoline taxes in that diesel fuel can be purchased by the refueler tax-free, since much of it is used in tax-free vehicles, and for tax-free heating and other off-road uses. This means that the refueler may have to purchase, store, and deliver up to three different diesel fuels to provide competitive pricing to customers and to avoid paying expensive taxes while awaiting tax refunds from the government. The three diesel fuels are: tax-paid, undyed, low-sulfur diesel fuel for on-road use; tax-free, dyed, low-sulfur diesel fuel for qualifying tax-exempt buyers for on-road use; and tax-free, dyed, high-sulfur diesel fuel for off-road use only. There are serious penalties for refuelers who violate these tax laws. Even innocent mistakes can be very costly to the refueler since the taxes on each gallon can be more than ten times the refueler's gross margin on each gallon sold. Therefore, the most important tax considerations in refueling with diesel fuel products are that accurate, detailed records be kept of each delivery of tax-free fuel to substantiate its validity and the subsequent tax-free billing; that each delivery of tax-paid fuel include the taxes in the customer billing according to the law, and to the arrangement with that customer if the customer is tax-exempt; and that the documentation of the vehicles refueled be sufficient to support the billings and tax refund claims. A tax-exempt customer may always claim a tax refund for tax-paid diesel fuel, but the refueler has the option to deliver the fuel tax-free and to claim the refund itself as a service to two specific classes of customers: state and local government agencies, and farmers (but not non-profit educational organizations, as in the case of gasoline). All other tax-exempt customers (intracity bus companies, school bus operators, and non-profit schools, for example) must file their own claims, for which they must have accurate delivery records from the refueler regarding each day's deliveries.

The environmental laws and regulations add another layer of complexity to the refueling process. As of Jan. 1, 1995, the United States' nine most severe ozone non-attainment metropolitan areas are required to use only reformulated gasoline (RFG), which is expected to be $0.10 or more per gallon more expensive than non-RFG gasoline. Another 30 less severe ozone non-attainment metropolitan areas have the requirement that they use only oxygenated gasoline during the winter months, which is usually satisfied by a gasohol product (a blend of gasoline and ethanol). Gasohol is also more expensive than straight gasoline, although it carries a federal tax credit, which could offset some or all of the price difference, depending on the comparative prices of gasoline and ethanol on the market each day. The requirement for RFG and oxygenated gasolines in these 39 non-attainment areas applies to dispensing at the retail level and to deliveries to retail and commercial users located in these areas, which includes refueling deliveries. Since these 39 areas are defined by county boundaries, and many, if not most, refuelers serve customers both inside and outside the defined areas, the refueler must be absolutely certain that a qualifying, and higher cost, gasoline product is delivered into vehicles within the defined areas; but also offer a less expensive product to customers outside the areas.

The environmental laws and regulations are similar in regard to diesel fuel. Since Oct. 1, 1993, diesel vehicles licensed for highway use must use only low-sulfur diesel fuel. This fuel is sold tax-paid to the refueler as an undyed product that is legal for any vehicle to use on the highway. (If used in a qualifying tax-exempt vehicle, or for other non-taxable use, a tax refund can be claimed.) The traditional, high-sulfur diesel fuel is now restricted to off-highway use, such as for heating or for construction equipment. This fuel is sold tax-free to the refueler dyed red, and is never legal in a highway vehicle. Since many on-highway diesel vehicles are not subject to the federal diesel tax, the refueler can also buy a third diesel product, a tax-free, low-sulfur diesel fuel dyed red that is legal on the highway only in qualifying tax-exempt vehicles, such as state and local government vehicles, school buses, and intracity buses, for example.

There are severe penalties for failure to follow these environmental regulations covering gasoline and diesel fuel deliveries, including fines of up to $25,000 per day per violation. Everyone in the distribution chain can be cited for a violation, from refiner to truck driver, if they "knew or should have known" of prohibited deliveries. Even inadvertence may not prevent a citation. In summary, the refueler's environmental obligations regarding gasoline and diesel fuel deliveries are complicated but indisputable: make absolutely certain that each gasoline product is legal for the geographic area into which it is delivered; make absolutely certain that each dyed diesel product is legal for the vehicle or tank into which it is delivered; provide delivery documents to customers that explicitly identify the products delivered according to mandated terminology; and keep a detailed record of every delivery made as proof of compliance.

There is a need to ensure compliance by the delivery truck drivers with all of these requirements: to advise the driver of the proper fuel to use for each vehicle, considering the vehicle and the geographic area; to confirm to the driver that the correct delivery hose has been selected to deliver this fuel; to directly control fuel deliveries into critical vehicles, such as emergency vehicles; to calculate and record the gallons delivered and identify the product for each vehicle's fuel delivery; to record and analyze what the driver actually does, and to warn of errors; and to keep an accurate, detailed record of all refueling actions for customer delivery and billing documents, proof of compliance, and substantiation of tax refund claims. Compliance by the drivers reduces the amount of potential liability the refueler may have for improper delivery of the various products.

The method and apparatus of the present invention satisfies all of these requirements. It is accordingly a principle object of the present invention to provide a method for ensuring delivery of the proper petroleum or similar product from a delivery truck into each customer vehicle or storage tank; to promptly warn the driver of errors; and to record the exact gallons delivered and the product identity for each vehicle's fuel delivery.

Another object of the present invention is to provide a method for delivering products with increased accuracy that is economical, simple, and efficient to use.

Yet another object of the present invention is to provide a method for delivering products that is reliable, dependable, cost effective, and easy to follow.

Still another object of the present invention is to provide a method for delivering products that reduces the risk of transferring into a customer vehicle a type or blend of petroleum or similar product that is improper for that vehicle or geographic location; to directly control the refueling of critical vehicles, whose engine failure could be especially serious; and to warn the driver of erroneous refueling of other vehicles before the driver leaves the customer site.

A further object of the present invention is to provide a method for delivering products that includes a system of monitoring the driver's delivery actions for conformity with the delivery instructions for each customer vehicle; and to evaluate all of the driver's actions, after the fact, for conformity to the delivery procedures, and for improving the process from experience.

Yet a further object of the present invention is to capture, in computer-processable form, all of the details of each vehicle delivery, including gallons delivered and the product identity, for computer preparation of customer delivery and billing documents and tax-refund documents, and for posting inventory, sales, and financial records.

Still a further object of the present invention is to eliminate unnecessary labor in manually recording and transcribing data regarding refueling deliveries, as well as to eliminate the errors that this causes.

SUMMARY OF THE INVENTION

In accordance with the present invention, a machine-readable identification system involving a plurality of passive read-only memory (passive ROM) devices, each capable of storing a unique digital serial number, and which can be interrogated by a portable hand-held probe, are affixed near to customer vehicle fuel tank inlet pipes. There is also a passive ROM device permanently affixed to the driver's personal ID badge, to each customer site, and to each delivery hose. With no limitations intended, the ROM devices may comprise an electronic identification data carrier of the following type: Touch Serial Number DS1990 manufactured and sold by Dallas Semiconductor Corporation. A portable digital hand-held probe used to interrogate the ROM devices may be a compatible probe manufactured by Videx Corporation or other manufacturer.

The passive ROM device includes a unique 48-bit serial number or machine-readable identifier value. The hand-held probe includes a battery, real-time clock, and microprocessor chip; a ROM memory for storing the program of instructions to be executed by the microprocessor; a RAM memory for storing customer site and vehicle data, driver and delivery hose data, operands, date and time, and identifier values read out from the passive ROM devices; and a means for interrogating the passive ROM devices with the hand-held probe. The probe also includes an indicator device, at the least an audible beeper or a visual readout such as an LED signal light.

In accordance with the present invention, a digital computer system is also installed in the cab of each delivery truck. This on-board computer includes a microprocessor chip, a power supply and back-up battery, and a real-time clock; a RAM memory for storing the program of instructions to be executed by the microprocessor, for storing readings from the delivery truck's meter(s), and for storing data collected from the hand-held probe; a display screen, a printer, and a removable PCMCIA mass storage device that can withstand the shock and vibration in this on-board application; a downloader that allows communication between the on-board computer and the hand-held probe; and a digital pulse counter(s) and controller that allows the on-board computer to read the accumulating gallonage being passed through the truck meter(s), and to set relay contacts that directly control the flow of fuel into vehicles identified as critical vehicles. With no limitations intended, the digital computer and its peripheral components may be any conventional, portable personal computer; the downloader may be a Model TPD-000 Downloader manufactured by Videx Corporation; the pulse counter and relay contact controller may be a Z-World Engineering Model C-PLC-STD Miniature Controller; and the delivery truck meter(s) may be equipped with a meter pulser such as a Liquid Controls Corporation Model 42675 Dry Reed Pulser.

At the beginning of each delivery day, the driver is given several Delivery Lists prepared by the refueler's office computer that describe how to load the delivery truck for the driver's several trips for that day, each one showing the approximate quantities, types, and blends of products to be delivered to each customer site, but not giving any vehicle details. The driver is also given a hand-held probe that has been previously loaded from the refueler's office computer with the detailed customer vehicle and site information that correlates with the Delivery Lists to be executed during the day. To verify that the driver has been given the correct hand-held probe before leaving the office, the driver touches the hand-held probe to the passive ROM device affixed to the driver's permanent ID badge, and receives a confirming signal.

When entering the delivery truck at the beginning of the day, the driver inserts the hand-held probe into the on-board computer's downloader, and requests that the on-board computer provide its clock time to the probe, which the probe uses to reset its internal clock. (Although it is convenient to think of these two clocks as being exactly synchronized, and it may help the driver in handling exceptions, the process works even if they are not synchronized.)

When arriving at each customer site, the driver first uses the hand-held probe to interrogate the customer site's passive ROM device. If the driver fails to do this, the first vehicle interrogation will remind the driver of the need to interrogate the customer site passive ROM device. Identifying the customer site allows the hand-held computer program to consider environmental laws regarding gasoline-fueled vehicles at that geographic location, and allows the correct recognition of local taxes that apply at that location.

When delivering products to customer vehicles at a customer site, the driver may deliver two or more different types or blends of products to the various customer vehicles. The hand-held probe is used to advise the driver of the proper fuel product to deliver to each vehicle, considering the vehicle's specific engine requirements, the tax laws, and the environmental laws and regulations that apply to that customer site's geographic location. The order of refueling the customer vehicles is inconsequential. Just prior to refueling each vehicle, the driver touches the vehicle's passive ROM device with the hand-held probe. A series of beeps or other type of signal may be emitted from the hand-held probe to inform the driver of the correct fuel to use for the vehicle. As a confirmation, the driver touches the hand-held probe to the passive ROM device located at the nozzle of the selected delivery hose; a signal confirms that this is the correct hose or warns that it is not. If this is a critical vehicle, the driver is given an additional signal when the passive ROM device on the vehicle is touched, advising the driver to enter the hand-held probe into the downloader in the truck cab before refueling. This allows the on-board computer to directly control the fuel delivery process, using a relay contact that allows the truck to pump only the fuel required by this vehicle. After refueling each vehicle, the driver may use the hand-held probe to touch the passive ROM device on the next vehicle to be refueled.

Each probe use by the driver is recorded and stored in the RAM memory of the hand-held probe, namely: the serial number of the passive ROM device on the vehicle or hose, the date and exact time of the refueling action, accurate to the second, and a record of the signal given to the driver, including the signal regarding hose selection.

At the same time, and during the entire driver's day, the delivery truck's on-board computer continually interrogates the pulse counter(s) connected to the truck's meter(s) every 10 seconds, storing in the on-board computer's PCMCIA mass storage device the accumulated gallons that have been delivered from the meter(s) at these ten-second intervals, along with the exact time, accurate to the second. These records are correlated with the time-of-refueling records stored in the hand-held probe for each vehicle refueled to determine the exact gallonage and specific product delivered to each vehicle.

After refueling all of the vehicles at a customer site, the driver inserts the hand-held probe into the downloader of the on-board computer, and transfers the vehicle data recorded in the hand-held probe at this refueling stop into the on-board computer. An on-board computer program then correlates the time of refueling of each vehicle from the hand-held probe file with the ten-second meter readings recorded in the on-board computer file. From this data, the program calculates the gallonage and identifies the specific product delivered into each vehicle, and prints a refueling list for the customer which lists each vehicle refueled and the exact gallons and product delivered into it. If desired, the on-board computer can also produce a final customer invoice, complete with all applicable federal, state, and local taxes. Also from this data, a priority exception list is printed for the driver before the driver leaves the site. This exception list shows any vehicle fuel delivery which was erroneous and needs the driver's immediate attention, such as a gasoline/diesel fuel mixup, or a fuel delivery that violates tax or environmental laws. These errors can occur if the driver does not confirm the delivery hose choice, or otherwise fails to follow instructions and carry out the method of the present invention.

Exceptions to this routine are handled by the driver's inputting a signal to the hand-held probe by touching the driver's passive ROM device affixed to the driver's permanent ID badge. This records the time of the exception. The driver then manually records the necessary facts. For instance, if a vehicle is parked in the customer lot without a passive ROM device on it, the procedure could allow the driver to refuel it based on the driver's judgment of the choice of fuel. Later the driver could enter a vehicle description or identification (not a passive ROM device serial number) into the on-board computer, in the time slot that previously recorded the touch of the driver's passive ROM device. The on-board computer program can correlate this data with its record of ten-second meter readings, and include it on its refueling report and customer billing.

At the end of each day, the driver turns in to the refueler's main office the driver's hand-held probe and the PCMCIA mass storage device from the on-board computer, which contains all of the data recorded by both computers during the day, including exception reports, refueling lists, and customer bills. This data allows the refueler's office computer to complete all customer billing requirements, to prepare all tax-refund schedules, and to post inventory, sales, and financial records. In addition, the data allows monitoring the driver's conformity with the delivery procedures, and analyzing the processes for the purpose of improving them.

The foregoing and other objects and advantages of the present invention will be readily apparent to those skilled in the art from a review of the following detailed description of the preferred embodiment, in conjunction with the accompanying drawings and claims.

DESCRIPTION OF THE DRAWINGS

FIG. 4 is a representation of a sample delivery truck Delivery List.

DETAILED DESCRIPTION OF THE PREFERRED EMBODIMENT

Figure 2:
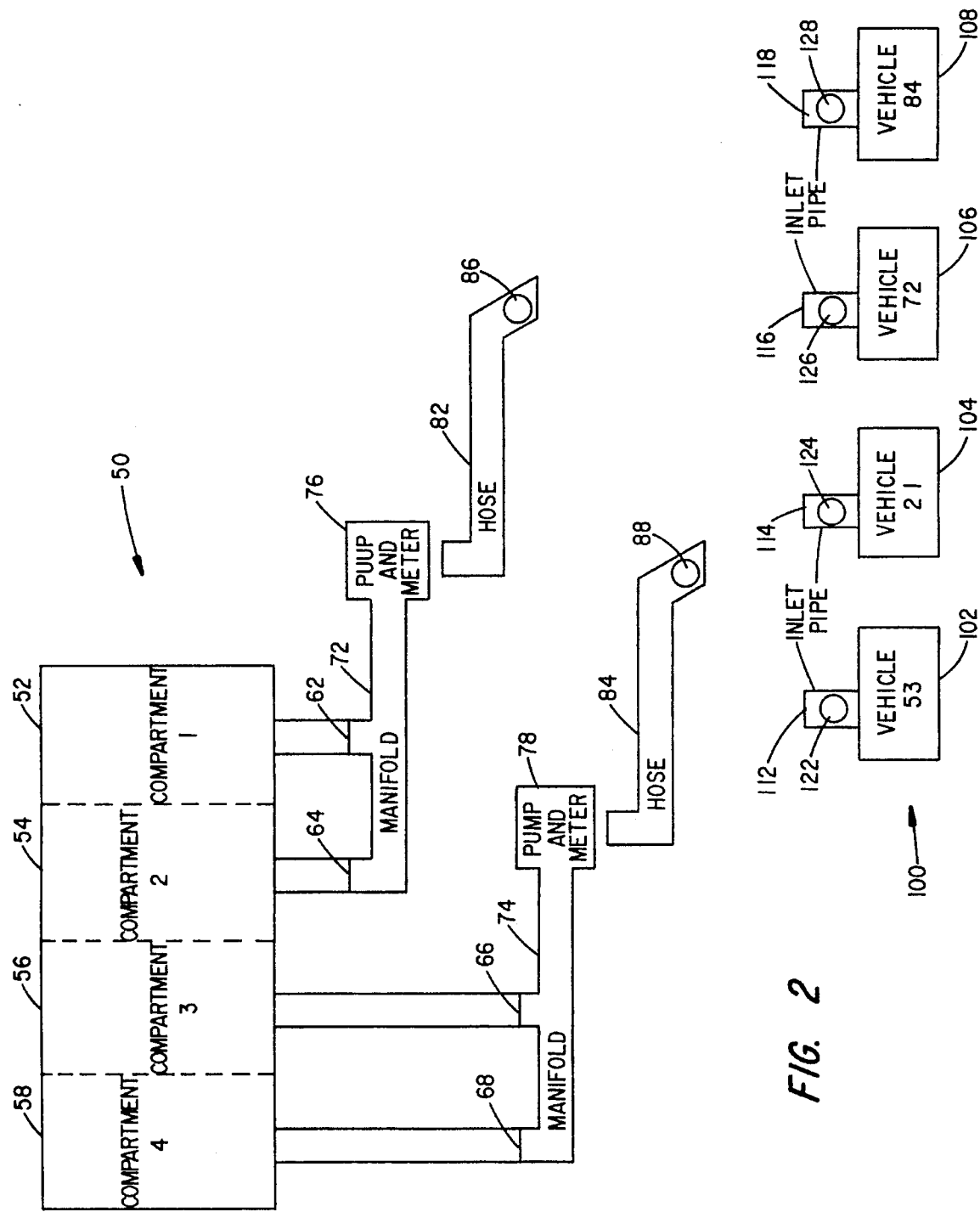
FIG. 2 is a block diagram of a delivery truck compatible for use in the preferred method of on-site refueling, with two pumps and meters, and two associated delivery hoses used to deliver products from the truck's compartments into customer vehicles.

Referring first to FIG. 2 there is indicated generally by a block diagram, a delivery truck 50, having a plurality of compartments 52, 54, 56, and 58 and a corresponding outlet valve 62, 64, 66, and 68 that controls the flow of the product from each compartment to a manifold, and then through a pump and associated meter to a connected hose. Compartments 52 and 54 share manifold 72, pump 73, meter 76, and hose 82. Compartments 56 and 58 share manifold 74, pump 75, meter 78, and hose 84. The delivery hose 82 allows compartments 52 and 54, and corresponding valves 62 and 64, and corresponding pump 73 and meter 76 of the delivery truck 50 to be coupled to the plurality of customer vehicle fuel tanks 100. The delivery hose 84 allows compartments 56 and 58, and corresponding valves 66 and 68, and corresponding pump 75 and meter 78 of the delivery truck 50 to be coupled to the plurality of customer vehicle fuel tanks 100. Each delivery hose has a passive ROM device 86 and 88 affixed near to the delivery nozzle that is machine-readable and allows the hand-held probe to confirm that the driver has selected the proper hose for delivery of the product into the selected customer vehicle tank. In the unusual case where the refueler wants to deliver more than one type or blend of gasoline, or more than one type or blend of diesel fuel on the same load through the same manifold, pump, meter, and hose, each compartment outlet valve also has a passive ROM device 63, 65, 67, and 69 affixed near to the valve that is machine-readable and allows the hand-held probe to further confirm that the driver has selected the proper compartment for delivery of the product into the selected customer vehicle tank.

Each customer vehicle fuel tank 102, 104, 106 and 108 has a corresponding inlet pipe 112, 114, 116, and 118 which allows the transfer of product into the tanks. Each inlet pipe has a passive ROM device 122, 124, 126, and 128 affixed that is machine-readable and allows the hand-held probe to identify the vehicle. After identifying the vehicle, the hand-held probe's program advises the delivery truck driver of the proper product to deliver into the tank, considering both vehicle and geographic requirements. An alternative machine-readable identifier having not only a serial number, but also coded identification of the proper fuel for the vehicle, can be affixed to each tank inlet pipe, and this device will not only uniquely identify the vehicle but will also read into the hand-held probe the specific fuel requirements of the vehicle. This would facilitate a nationwide system of vehicle fuel identifiers, for instance, without requiring that each refueler maintain a data base of all of the vehicle serial numbers. The current method does not describe this additional facility since it is redundant for a local refueler's operation.

Figure 3:
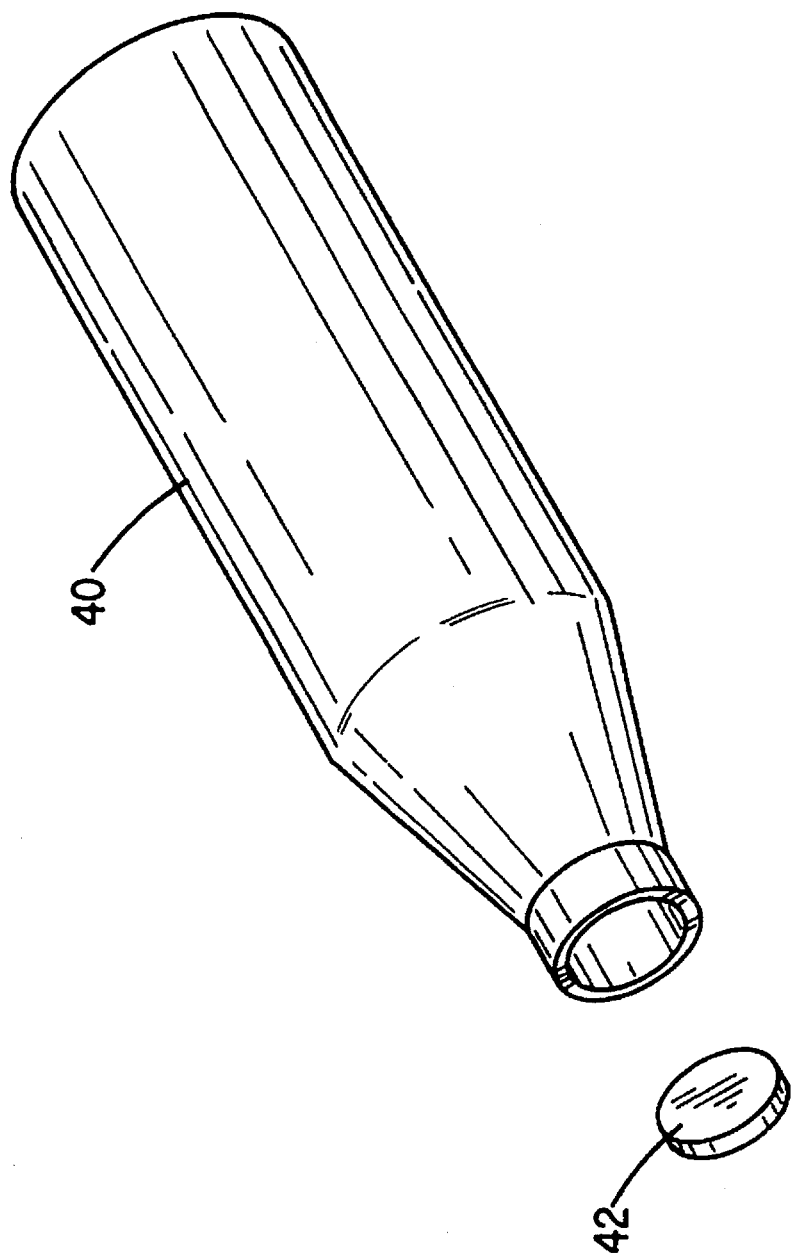
FIG. 3 is a perspective view of a hand-held probe aligned and elevated above a passive ROM device.

The driver also has a passive ROM device 42 (FIG. 3) permanently affixed to the driver's personal ID badge, and each customer refueling site has a passive ROM device 42 permanently affixed to the site, such as at its entrance gate. The passive ROM device 42 could also be affixed to the product-delivery pipes or hoses of the storage facility at which the truck is loaded to allow checking the correctness of the delivery of products into the truck compartments as well.

The hand-held probe 40 has a means for accepting or receiving information from the passive ROM device 42. Each passive ROM device 42 is capable of storing a digital value and may be interrogated by the portable hand-held probe 40. With no limitation intended, the ROM device 42 may comprise an electronic identification data carrier of the following type: Touch Serial Number DS1990 (which contains only a ROM serial number) or Touch Memory DS1992 (which contains a ROM serial number plus a 256-byte RAM to use to directly store each vehicle's fuel requirements) manufactured and sold by Dallas Semiconductor Corporation. The portable digital hand-held probe 40 used to interrogate the ROM devices 42 may be a compatible probe manufactured by Videx Corporation or other manufacturers.

The passive ROM device 42 includes a unique 48-bit serial number or machine-readable identifier value. The passive ROM device 42 comprises a passive ROM capable of storing 64 bits of data in a rugged moisture-proof container of a size comparable to a standard watch button battery. Those skilled in the art will appreciate that other machine-readable storage and coding schemes, such as bar code, could be used as well. If a different coding scheme, such as bar coding, is used, the probe will have to be one capable of scanning and converting the bar code to a digital value; and the probe 40 must later be downloaded to a delivery truck on-board computer and to an office computer system, each capable of receiving the information conveyed or transmitted from the device 42 and capable of comparing the transmitted information with data previously stored in the respective computer's memory.

The hand-held probe 40 includes a battery, a real-time clock, a microprocessor chip, a ROM memory for storing a program of instructions to be executed by the microprocessor, a RAM memory for storing customer site and vehicle data, driver and delivery hose data, operands, date and time, and identifier values read out from the passive ROM devices; and a means for interrogating the passive ROM devices with the hand-held probe. The probe also includes an indicator device, such as an audible beeper or a visual readout with an LED light display being preferred. The hand-held probe may communicate with a personal computer through a downloader station, allowing data to be uploaded into a specific segment of the probe's RAM memory, or to be downloaded into the personal computer from the probe.

The hand-held probe 40 is designed to align and engage (interrogate) the passive ROM digital memory identifier 42. When the hand-held probe is engaged with the passive ROM device 42, an electric signal is transmitted to the hand-held probe 40. This signal represents an electronic serial number. Each time the hand-held probe 40 receives an electronic serial number, the probe converts this signal into a digital number, and compares the digital value representing the electronic serial number with serial numbers stored in its RAM memory for customer sites, customer vehicles, and the delivery truck delivery hoses included in the driver's Delivery Lists for the day.

Figure 1:
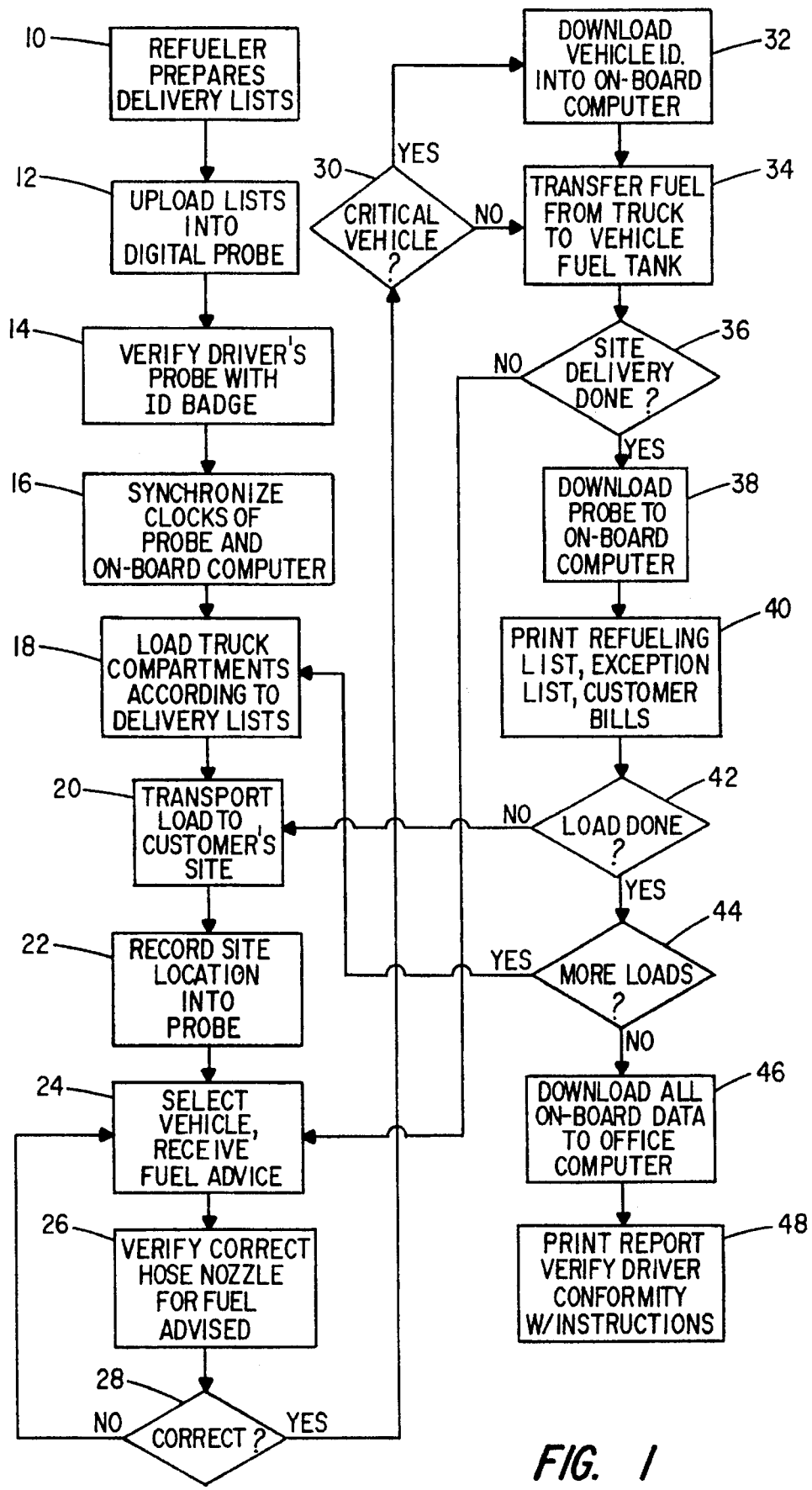
FIG. 1 is a flow chart representing a preferred method of on-site refueling—delivering petroleum and similar products from a delivery truck into customer vehicles at the customer's site.

Referring next to FIG. 1, there is indicated generally by means of a flow diagram the preferred method of on-site refueling of the present invention utilizing the digital probe 40, the passive ROM device or machine-readable identifier 42, and an on-board delivery truck computer. Before the drivers begin their deliveries for the day, Delivery Lists are prepared on an office computer at the refueler's facility for each driver (block 10). The Delivery Lists (see FIG. 4) contain all of the information the driver needs to complete all of the deliveries to be made by the driver for the day. The Delivery Lists may vary according to the configuration of the truck to be used in regard to compartment storage sizes and the connections between compartments, pumps, meters, and delivery hoses. Although these connections can be changed, the meters must be removed from the truck to be calibrated differently for gasoline and diesel fuel. As a practical matter, the truck configurations are left alone for extended periods of time. This means that the office computer can directly relate each product loaded into a compartment to a particular pump, meter, and delivery hose. The refueler's office computer stores these configuration details and produces Delivery Lists that take them into account. In the unusual case that a refueler wants to meter two different gasolines, or two different diesel fuels, on the same load through the same pump, meter, and delivery hose, the driver must change the compartment outlet valves accordingly, and passive ROM devices would also be affixed near to the compartment outlet valves rather than just near to the delivery hose nozzle.

The Delivery List for one truckload may contain the following information: the load number, the truck, the driver, the storage facility at which to load, the quantity and blend of each product to be loaded into each truck compartment, the list of customer sites to which deliveries should be made, and the approximate quantity and type/blend of product to be delivered into the customer vehicles at each site. The refueler's office computer also constructs the file to be loaded into each driver's probe 40 that is necessary for the probe's program of instructions to control and record the driver's deliveries for the day according to the preferred method. The probe will be uploaded with this file (block 12), including the serial numbers of the passive ROM devices 42 involved in the driver's Delivery List for the day: the driver, the delivery hoses, the customer sites, and the customer vehicles or tanks.

Next, the driver confirms that he or she has the proper hand-held probe 40 by engaging the probe that has been provided to him or her with the passive ROM device 42 attached to his or her ID badge and receiving a confirming signal from the probe (block 14). Then, the driver boards the assigned truck and inserts the probe into the downloader attached to the truck's on-board computer, requesting that the on-board computer provide its clock time to the probe (block 16). An exact synchronization of the probe's and on-board computer's clocks is not necessary for the process to work, but it may be helpful to the driver to have them synchronized in dealing with exceptions.

The driver then proceeds to the storage facility on the driver's first Delivery List for the day to fill up the compartments 52, 54, 56, and 58 of the delivery truck 50 with the various types/blends of petroleum products according to the Delivery List (block 18). A passive ROM device 42 could also be attached to these storage tanks at the storage facility, thereby requiring the driver to verify the loading of the petroleum into the proper truck compartments 52, 54, 56, or 58. The current method does not employ these additional steps because the various products are rarely placed into the improper truck compartment when loading the petroleum into the truck 50.

With the compartments filled according to the Delivery List, the driver drives the truck 50 to the first customer site (block 20) listed on the Delivery List (FIG. 4). The driver engages the probe with the passive ROM device 42 attached to a location at the customer's site (block 22) and receives a confirming signal from the probe. This customer site identification causes the probe computer to set up the correct logic to use the applicable environmental regulations in advising the proper gasoline fuel to use in each vehicle at this site, and to recognize the location for purposes of local taxes on the delivery.

The driver then selects the first customer vehicle to be refueled, and engages the probe with the passive ROM device affixed to the vehicle's fuel inlet pipe, receiving from the probe a series of beeps that indicate the proper fuel for this vehicle, considering the vehicle's fuel requirements, the vehicle's fuel taxability, and the environmental regulations for this site (block 24). The driver also receives a signal that this is a critical vehicle if it is. The signal emitted from the hand-held probe 40 could also be a series of blinking lights, a message on an LED display, or some other indicator; however, a series of beeps is the preferred emitted signal. A record is made in the probe RAM at this time of the vehicle's passive ROM device serial number, of the advice given to the driver, and of the exact time of the contact, accurate to the second, between the probe and the passive ROM device.

Next, the driver engages the probe with the passive ROM device affixed near to the selected delivery hose nozzle (block 26), receiving from the probe a signal that confirms that this is the correct hose for the required fuel, or an error signal if it is not. In the unusual event that the refueler is using a single pump, meter, and delivery hose to deliver more than one type or blend of gasoline, or more than one type or blend of diesel fuel, on the same load from different compartments, the driver may be advised by a signal from the probe to switch compartments at this time by use of the compartment outlet valves. If this is done, the passive ROM device affixed to the outlet valve of the compartment selected for this vehicle must also be engaged by the hand-held probe for the driver to receive a signal that the correct compartment is selected, and to store in the probe the compartment now associated with this delivery hose. If the driver's hose selection is not correct, the driver repeats the selection and confirmation process (block 28).

When the hose selection is confirmed as correct, the driver's next action depends on whether this is a critical vehicle that requires directly controlled refueling (block 30). If it is, the driver places the hand-held probe into the downloader in the truck cab to download into the on-board computer the passive ROM device serial number of this vehicle (block 32). Based on this serial number, the on-board computer enables the operation of only the correct pump to refuel this vehicle. The driver then delivers the fuel into the vehicle (block 34). After refueling one vehicle, the driver repeats the vehicle refueling process (block 36) until all of the vehicles at the customer site have been refueled.

After refueling all of the vehicles at a site, the driver downloads into the truck's on-board computer the data captured in the probe regarding the vehicles refueled at this site (block 38). While the driver was refueling the vehicles, the on-board computer was continually reading the accumulating gallonage of the truck's meter(s) at ten-second intervals, storing these readings into a table in its PCMCIA mass storage device. These timed readings are now available to be correlated with the recordings stored in the probe of the vehicle serial number identifiers and the time of each refueling. From this data, the on-board computer calculates the exact gallonage and product identification delivered into each customer vehicle. An exact synchronization of the probe's and on-board computer's clocks is not necessary, since aligning the first vehicle's refueling activity with the first flow of product through the meter(s) allows all succeeding vehicles to be aligned by the time difference, not by the absolute time. The on-board computer then prints (block 40) an exception list for the driver, indicating any refueling errors that were made contrary to the advice given to the driver; a refueling list for the customer, identifying each vehicle refueled, the exact gallons and the mandated product terminology for the fuel delivered into it, and the taxability of the vehicle.(some vehicles at a site may be taxed and others not); and a final customer billing, complete with all applicable taxes, if desired.

If the driver has not completed all of the site deliveries on the Delivery List (block 42), the driver drives to the next customer site (block 20). If the Delivery List deliveries have been completed, but there are more loads on the driver's schedule for the day (block 44), the driver drives to the storage facility to reload the truck for the next Delivery List (block 18). If there are no more loads for the day, the driver returns to the refueler's office.

At the refueler's office, the driver turns in the hand-held probe 40 and the PCMCIA mass storage device from the truck's on-board computer. The PCMCIA mass storage device contains all of the day's activity for the truck and driver: a table of the on-board computer's ten-second meter readings; tables of all of the hand-held probe's activity (every serial number of every passive ROM device touched, the time of the touch, and a record of the signal response given to the driver); and copies of all reports printed. The PCMCIA mass storage device is downloaded to the office computer (block 46), and a driver's report is printed which shows the driver's use of the probe, highlighting cases of non-use and of errors, to further improve the process (block 48). The downloaded data is also used to complete customer billing, prepare tax refund claim schedules, and to post inventory, sales, and financial records. The method is then repeated each day of delivery.

The above method of on-site delivery of petroleum and similar products has been described herein in considerable detail in order to comply with the Patent Statutes and to provide those skilled in the art with the information needed to apply the novel principles and method and use of such specialized components as are required. However, it is to be understood that the method can be carried out by specifically different equipment and devices, and that various modifications, both as to the equipment details and operating procedures, can be accomplished without departing from the scope of the invention itself.

What is claimed is:

1. A method for ensuring accurate on-site delivery of petroleum or similar products from a delivery truck, through a pump, accumulating gallonage meter, and associated delivery hose, to the fuel tanks of customer vehicles or to customer storage tanks comprising:

(a) affixing to each customer site and to each of the fuel tanks at each site a machine-readable identifier carrying encoded information;

(b) providing the delivery truck with an on-board digital computer, said computer being able to periodically read said truck's accumulating gallonage meter at pre-determined intervals, and store these readings and the time each reading is taken;

(c) providing to the driver of the truck a delivery list having information thereon concerning where and how to load the truck with a product and where to deliver the product, and a digital probe having a microprocessor and a RAM memory for storing therein at least some of the information from the delivery list;

(d) loading said truck at a storage facility with a product in accordance with the information contained on said delivery list;

(e) transporting said product to said customer site;

(f) using said digital probe to read said machine-readable identifier affixed to said customer site;

(g) using said digital probe to read said machine-readable identifiers affixed to said fuel tanks;

(h) comparing information read from said machine-readable identifiers affixed to said fuel tanks with information stored in said RAM memory of said digital probe for signaling said driver the proper product to be loaded into said fuel tanks;

(i) recording in said digital probe the time said probe touched said machine-readable identifiers affixed to said fuel tanks; and (j) transferring the product from said truck into said fuel tanks of said customers through said delivery hose.

2. A method for ensuring accurate on-site delivery of petroleum or similar products from a delivery truck, the truck being partitioned into a plurality of compartments for transporting more than one type of product, each in a separate compartment, the truck having a plurality of manifolds, each manifold being connected to an associated accumulating gallonage meter and an associated delivery hose, and each compartment having an outlet valve controlling the flow of the product to said delivery hose via an associated one of the manifolds; and further including the steps of:

(a) affixing to each of a plurality of vehicle fuel tanks, to each of said delivery hoses and to each of said outlet valves a machine-readable identifier carrying encoded information;

(b) loading each of said truck compartments at a storage facility with products in accordance with the information contained on a delivery list;

(c) reading said machine-readable identifier affixed to a selected one of said delivery hoses and one of said vehicle fuel tanks using a digital probe, for confirming to a driver of said delivery truck that said selected delivery hose is proper to deliver the product into said one of said vehicle fuel tanks;

(d) reading said machine-readable identifier affixed to a selected one of said compartment outlet valves using said digital probe, when alternately unloading a plurality of products through a single meter and delivery hose, for confirming to said driver that said selected delivery hose and selected compartment are proper to deliver the product into said one of said vehicle fuel tanks;

(e) providing the delivery truck with an on-board digital computer, said computer being able to periodically read each of said truck's accumulating gallonage meters, and separately store these readings and the time of each reading at predetermined intervals; and (f) storing in said digital probe a time value as to when said digital probe touched said machine-readable identifier on said vehicle fuel tanks.

3. The method as recited in either claim 1 or 2 wherein said machine-readable identifier carrying encoded information comprises a passive read only memory device.

4. The method as recited in either claim 1 or 2 and further including the step of identifying certain customer vehicles as critical vehicles, and having said on-board computer directly control the unloading of fuel into said critical vehicles.

5. The method as recited in claim 2 and further including the step of verifying compliance by said driver with the use of the correct one of said delivery hoses and truck compartment outlet valves for each vehicle, before said driver leaves said customer site.

6. The method as recited in either claim 1 or 2 and further including the step of verifying at the end of each day compliance by said driver with the use of said method of delivery.

7. The method as recited in either claim 1 or 2 and further including the step of verifying that said digital probe provided to said driver matches an identification badge of said driver prior to loading said truck at the storage facility.

8. The method as recited in either claim 1 or 2 and further including the steps of:

(a) storing in said digital probe information read from said machine-readable identifiers;

(b) downloading all stored information, including the time the digital probe touched the machine-readable identifiers affixed to the tanks, from said digital probe into said on-board computer following the delivery of the products at each site;

(c) correlating the accumulating gallonage meter readings recorded by said on-board computer with the time and vehicle information downloaded from said digital probe for each machine-readable identifier affixed to a tank that was read by said digital probe;

(d) producing an exception report listing delivery errors needing driver attention in said on-board computer before said driver leaves each site; and (e) producing in said on-board computer a refueling list for the customer, this list giving the exact gallons and exact product description of the fuel delivered into each tank.

9. The method as recited in either claim 1 or 2 and further including the steps of:

(a) downloading all stored information from said on-board computer into an office computer following the delivery of products; and (b) processing in said office computer all downloaded information to produce at least one of final customer billing reports, driver evaluation reports, and postings to inventory, sales, and financial records.

10. A method for ensuring accurate on-site delivery of petroleum or similar products from a delivery truck to the fuel tanks of customer vehicles or to customer storage tanks located at the site, comprising:

(a) providing a delivery truck partitioned into a plurality of compartments for transporting more than one type of product, each in a separate compartment, the truck having a plurality of manifolds, each manifold being connected to an associated accumulating gallonage meter and an associated delivery hose, and each compartment having an outlet valve controlling the flow of product to said delivery hose via an associated one of the manifolds;

(b) affixing to each one of said delivery hoses and said compartment outlet valves a machine-readable tag carrying encoded information;

(c) affixing to each customer site and each of the tanks at each site a machine-readable tag carrying encoded information;

(d) providing the delivery truck with an on-board digital computer, said computer being able to periodically read each of said truck's accumulating gallonage meters, and separately store these readings and the time of each reading at pre-determined intervals;

(e) providing to the driver of the truck a delivery list having information thereon concerning where and how to load the truck with products and where to deliver the products, and a digital probe having a microprocessor and a RAM memory storing therein at least some of the information from the delivery list;

(f) loading each of said compartments at a storage facility with the products in accordance with the information contained on said delivery list;

(g) transporting said products to said customer sites;

(h) using said digital probe to read said machine-readable tag affixed to said site;

(i) using said digital probe to read said machine-readable tags affixed to said tanks;

(j) comparing information read from said machine-readable tags affixed to said tanks with information stored in said RAM memory of said digital probe for signaling said driver the proper product to be loaded into said tank;

(k) recording in said digital probe the time said digital probe touched said machine-readable tags affixed to individual ones of said tanks;

(l) using said digital probe to read said machine-readable tag affixed to a selected one of said delivery hoses for confirming to said driver that the selected delivery hose is proper to deliver the product into said tank;

(m) using said digital probe to read said machine-readable tags affixed to said compartment outlet valves when alternately unloading a plurality of products through a single meter and delivery hose, for confirming to said driver that said selected delivery hose and selected compartment are proper to deliver the product into said tank; and (n) transferring the product from said truck into said tank of said customer through said selected delivery hose, following the confirmation.

11. The method as recited in claim 10 wherein said machine-readable tags carrying encoded information comprise a passive read only memory device.

12. The method as recited in claim 10 and further including the step of identifying certain customer vehicles as critical vehicles, and having said on-board computer directly control the unloading of fuel into said critical vehicles.

13. The method as recited in claim 10 and further including the step of verifying compliance by said driver with the use of the correct ones of said delivery hoses and truck compartment outlet valves for each vehicle, before said driver leaves said customer site.

14. The method as recited in claim 10 and further including the step of verifying at the end of each day compliance by said driver with the use of said method of delivery.

15. The method as recited in claim 10 and further including the step of verifying that said digital probe provided to said driver matches an identification badge of that driver prior to loading said truck at the storage facility.

16. The method as recited in claim 10 and further including the steps of:

(a) storing in said digital probe information read from said machine-readable tags; and (b) downloading all stored information, including the time the digital probe touched the machine-readable tags affixed to the tanks, from said digital probe into said on-board computer following the delivery of the products at each site;

(c) correlating the accumulating gallonage meter readings recorded by said on-board computer with the time and vehicle information downloaded from said digital probe for each machine-readable tag affixed to a tank that was read by said digital probe;

(d) producing an exception report listing delivery errors needing driver attention in said on-board computer before said driver leaves each site; and (e) producing in said on-board computer a refueling list for the customer giving the exact gallons and mandated product description of the fuel delivered into each tank.

17. The method as recited in claim 10 and further including the steps of:

(a) downloading all stored information from said on-board computer into an office computer following the delivery of products; and (b) processing in said office computer all downloaded information to produce at least one of final customer billing reports, driver evaluation reports, and postings to inventory, sales, and financial records.

18. A method for delivering petroleum or similar products from a delivery truck to the tanks of a plurality of vehicles located on a customer's site, through an elongated hose, the delivery truck having an accumulating gallonage meter and an on-board microprocessor, the microprocessor having a means for periodically sensing and recording readings of the gallonage meter at predetermined time intervals, comprising the steps of:

(a) affixing to the tank of each of the plurality of vehicles at the site a machine-readable identifier carrying encoded information;

(b) providing the driver of the delivery truck with a digital probe having a microprocessor and associated memory for storing the times upon which said digital probe is used to interrogate said machine-readable identifiers on said tanks;

(c) interrogating a machine-readable identifier affixed to the tank of one of the plurality of vehicles, and storing in the memory of said digital probe the information read from said machine-readable identifier, prior to dispensing fuel into the tank of the one vehicle;

(d) repeating step (c) for each of the plurality of vehicles to be refueled;

(e) downloading the information stored in the memory of said digital probe into said on-board microprocessor of said delivery truck following step (d), and correlating the gallonage meter readings recorded by said on-board microprocessor with the times stored in the memory of said digital probe; and (f) preparing a document reflecting the gallonage of fuel delivered to each of the plurality of vehicles.

* * * * *